(12) United States Patent
Schmalkuche et al.

(10) Patent No.: US 8,299,171 B2
(45) Date of Patent: Oct. 30, 2012

(54) LOW-EMISSION POLYURETHANE BACKING LAYER, SPRAY POLYURETHANE SYSTEM FOR PRODUCING SUCH A BACKING LAYER, AND USE OF SUCH A BACKING LAYER

(75) Inventors: Cord Schmalkuche, Damme (DE); Udo Hadick, Cloppenburg (DE); Holger Leifheit, Osnabrueck (DE); Georg Partusch, Lemfoerde (DE); Franz Xaver Redl, Lemfoerde (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 86 days.

(21) Appl. No.: 12/374,827

(22) PCT Filed: Jul. 18, 2007

(86) PCT No.: PCT/EP2007/057405
§ 371 (c)(1), (2), (4) Date: Jan. 23, 2009

(87) PCT Pub. No.: WO2008/012247
PCT Pub. Date: Jan. 31, 2008

(65) Prior Publication Data
US 2009/0326148 A1 Dec. 31, 2009

(30) Foreign Application Priority Data

Jul. 24, 2006 (EP) .................................... 06117749

(51) Int. Cl.
C08G 18/32 (2006.01)
B29C 41/08 (2006.01)

(52) U.S. Cl. ........ 524/875; 524/196; 524/590; 524/847; 524/874; 528/61; 528/65; 528/66

(58) Field of Classification Search .................. 524/196, 524/589, 590, 874, 875, 847; 528/61, 65, 528/66
See application file for complete search history.

(56) References Cited

U.S. PATENT DOCUMENTS

| | | | | |
|---|---|---|---|---|
| 4,119,594 A * | 10/1978 | Iobst et al. | ...................... | 528/57 |
| 4,528,319 A * | 7/1985 | Ottaviani et al. | ............. | 524/540 |
| 5,410,011 A * | 4/1995 | Konishi et al. | ................... | 528/73 |
| 5,614,575 A * | 3/1997 | Kotschwar | ..................... | 524/270 |
| 5,965,686 A * | 10/1999 | Blank et al. | ....................... | 528/56 |
| 6,084,001 A | 7/2000 | Foreman et al. | | |
| 6,924,321 B2 * | 8/2005 | Casati et al. | ................... | 521/167 |
| 7,691,480 B1 * | 4/2010 | Stearns | ....................... | 428/423.3 |
| 2002/0001722 A1 | 1/2002 | Harrison et al. | | |
| 2003/0100699 A1 * | 5/2003 | Waddington et al. | ........... | 528/44 |
| 2004/0171786 A1 | 9/2004 | Klein et al. | | |
| 2005/0043423 A1 * | 2/2005 | Schmidt et al. | ................ | 521/155 |
| 2005/0131136 A1 * | 6/2005 | Rosthauser et al. | .......... | 524/589 |
| 2005/0277724 A1 * | 12/2005 | Pavlinac | ....................... | 524/445 |
| 2006/0009605 A1 * | 1/2006 | Erickson et al. | ................ | 528/44 |
| 2007/0078253 A1 * | 4/2007 | Ulbrich et al. | ................... | 528/44 |
| 2007/0237965 A1 * | 10/2007 | Rosthauser | ................ | 428/423.1 |
| 2009/0267254 A1 * | 10/2009 | Nishikawa et al. | .......... | 264/46.4 |

FOREIGN PATENT DOCUMENTS

EP 1 600 466 11/2005

OTHER PUBLICATIONS

"About Zeolites". Obtained from http://www.zeoinc.com/zeolites.html. No Author. 2010.*

* cited by examiner

*Primary Examiner* — Mark Eashoo
*Assistant Examiner* — Michael A Salvitti
(74) *Attorney, Agent, or Firm* — Oblon, Spivak, McClelland, Maier & Neustadt, L.L.P.

(57) ABSTRACT

The present invention relates to a spray-polyurethane system which comprises a polyol component (A) and an isocyanate component (B), where the polyol component (A) comprises a1) at least one compound reactive with isocyanate, a2) at least one reactive chain extender having at least two groups reactive toward isocyanates, where at least one group reactive toward isocyanates is a free, primary $NH_2$ group, and also a3) at least one metal catalyst, and a4) if appropriate, further additives, where the spray-polyurethane system comprises no amine catalyst. The present invention moreover relates to a process for production of a backing layer composed of polyurethane for moldings and to the use of this backing layer for production of automobile parts. Inventive backing layers have good mechanical properties, and low emissions, and their demolding time is small when compared with the open assembly time.

21 Claims, No Drawings

LOW-EMISSION POLYURETHANE BACKING LAYER, SPRAY POLYURETHANE SYSTEM FOR PRODUCING SUCH A BACKING LAYER, AND USE OF SUCH A BACKING LAYER

The present invention relates to a spray-polyurethane system which comprises a polyol component (A) and an isocyanate component (B), where the polyol component (A) comprises a1) at least one compound reactive with isocyanate, a2) at least one reactive chain extender having at least two groups reactive toward isocyanates, where at least one group reactive toward isocyanates is a free, primary $NH_2$ group, and also a3) at least one metal catalyst, and a4) if appropriate, further additives, where the spray-polyurethane system comprises no amine catalyst. The present invention moreover relates to a process for production of a backing layer composed of polyurethane for moldings and to the use of this backing layer for production of automobile parts.

Further embodiments of the present invention are found in the claims, in the description and in the examples. The above-mentioned features of the subject matter of the invention, and those that are to be explained below, can, of course, be used not only in the particular stated combination but also in other combinations, without going beyond the scope of the invention.

Polyisocyanate polyaddition products, usually polyurethanes and/or polyisocyanurates, obtainable via reaction of isocyanates with compounds reactive toward isocyanates, are well known. One particular embodiment of these products is provided by moldings laminated to a synthetic skin based on polyisocyanate polyaddition products. These moldings are usually composite parts which in essence comprise this skin as a backing layer and moreover typically comprise a flexible and polyurethane foam and, if appropriate, a stiff backing. The moldings are used, inter alia, in automobile construction, where they are used by way of example for production of seats, dashboards, consoles, trays or trim parts for internal or external applications, but they are also utilized in shipbuilding and in production of the vehicles used by the construction industry and by agriculture.

The skin here is typically formed by using a spray-polyurethane system. Polyol component and isocyanate component are mixed in this process and the resultant reaction mixture is sprayed into a mold. The polyol component then reacts with the isocyanate component to form polyurethane. These spray systems are known and are commercially obtainable by way of example as Elastoskin® from BASF Corporation.

The resultant skin based on polyisocyanate polyaddition products is a stable backing layer for moldings described above and, when compared with other backing layers, for example backing layers based on polyvinyl chloride, provides advantages with respect to ultimate tensile strength and undesired deformation, and also rapid deformability. Furthermore, the processing properties of the polyurethane thus formed also permit realization of complicated mold geometries. Given suitable machine technology, it is also possible to replicate deep undercuts with uniform layer thickness. Because the product is elastic over a temperature range from −30 to +80° C., there is no risk of ejection of fragments if an airbag is triggered. This is particularly important in the low-temperature region. These advantages make this backing layer based on polyurethanes ideal for use in production of these moldings.

EP 1600466 discloses by way of example a spray-polyurethane system and a skin that can be produced therefrom, where the spray-polyurethane system has an isocyanate component and a resin component and the resin component is reactive toward isocyanate. The isocyanate component also encompasses aromatic isocyanates. Materials mentioned as present in the resin component are polyols reactive toward isocyanate, for example polyethers or polyesters, chain extenders whose molar mass is up to 400 g/mol, e.g. hydrazines, primary and secondary diamines, amino alcohols, amino acid, other acids, glycols, or a mixture thereof. Catalysts that can be used are metal-based catalysts, amine-based catalysts, or a mixture thereof. The examples use polyetherols as isocyanate-reactive component, 1,4-butanediol as chain extender, and a mixture composed of metal-based and amine-based catalysts.

Although the backing layers composed of polyurethane have markedly reduced emission values for volatile constituents when compared with backing layers composed of, for example, polyvinyl chloride, even these backing layers give rise to substantial emissions. For the purposes of this invention, emission is VOC emission to VDA 278. The term "emission" specifically encompasses emissions of condensable constituents (FOG) to VDA 278, and also emissions to DIN 75201/B (FOGGING).

It is moreover desirable to make a further improvement in the mechanical properties of a skin based on polyisocyanate polyaddition products, examples being tensile strength, tensile strain, and tear propagation resistance.

An object of the invention is therefore to provide a spray-polyurethane system which is suitable for production of a backing layer composed of polyurethane for moldings and which has low emission, and also improved mechanical properties, specifically tensile strength, tensile strain, and tear propagation resistance.

Another object of the invention is to provide a skin based on polyisocyanate polyaddition products which has the advantages of known skins based on polyisocyanate polyaddition products but whose emission level has been reduced and whose mechanical properties, specifically tensile strength, tensile strain, and tear propagation resistance, have been improved.

This object is achieved via spray-polyurethane system which comprises a polyol component (A) and an isocyanate component (B), where the polyol component (A) comprises a1) at least one compound reactive with isocyanate, a2) at least one reactive chain extender having at least two groups reactive toward isocyanates, where at least one group reactive toward isocyanates is a free, primary $NH_2$ group, and also a3) at least one metal catalyst, and a4) if appropriate, further additives, and where the spray-polyurethane system comprises no amine catalyst.

For the purposes of the present invention, a spray-polyurethane system is a system composed of at least two components where a backing layer composed of polyurethane or polyisocyanurate can be obtained on mixing of the components and spraying of the resultant reaction mixture into a mold. Spraying polyurethanes are more reactive than casting polyurethanes, making it possible to obtain a fixed product when the reactive system encounters the mold.

The compound a1) used reactive with isocyanate can prize any polyol that can be used in polyurethane production. The polyol has preferably been selected from polyether polyols, polyester polyols, amine-functionalized polyols, and a mixture thereof. Polyether polyols are particularly preferred.

Suitable polyether polyols can be prepared by known processes, for example via anionic polymerization using alkali metal hydroxides, such as sodium hydroxide or potassium hydroxide, or using alkali metal alcoholates, such as sodium methoxide, sodium ethoxide or potassium ethoxide, or potassium propoxide as catalysts, with addition of at least one starter molecule which comprises from 2 to 4 reactive hydrogen atoms, or via cationic polymerization using Lewis acids, such as antimony pentachloride, boron fluoride etherate, etc., or bleaching earth as catalysts, from one or more alkylene oxides having from 2 to 4 carbon atoms in the alkylene radical.

Examples of suitable alkylene oxides are tetrahydrofuran, propylene 1,3-oxide, butylene 1,2-oxide or butylene 2,3-oxide, styrene oxide, and preferably ethylene oxide and propylene 1,2-oxide. The alkylene oxides can be used individually, in alternating succession, or as a mixture.

Examples of starter molecules that can be used are: water, organic dicarboxylic acids, such as succinic acid, adipic acid, phthalic acid, and terephthalic acid, aliphatic and aromatic, optionally N-mono-, N,N-, and N,N'-dialkyl-substituted diamines having from 1 to 4 carbon atoms in the alkyl radical, e.g. optionally mono- and dialkyl-substituted ethylenediamine, diethylenetriamine, triethylenetetramine, 1,3-propylenediamine, 1,3- or 1,4-butylenediamine, 1,2-, 1,3-, 1,4-, 1,5-, and 1,6-hexamethylenediamine, phenylenediamines, 2,3-, 2,4-, and 2,6-tolylenediamine, and 4,4'-, 2,4'-, and 2,2'-diaminodiphenylmethane.

Other starter molecules that can be used are: alkanolamines, such as ethanolamine, diethanolamine, N-methyl- and N-ethylethanolamine, N-methyl- and N-ethyldiethanolamine, and triethanolamine, and ammonia. Preference is given to use of polyhydric, in particular di- to octahydric alcohols, e.g. ethanediol, 1,2- and 1,3-propanediol, diethylene glycol, dipropylene glycol, 1,4-butanediol, 1,6-hexanediol, glycerol, and trimethylolpropane.

The polyether polyols, preferably polyoxypropylene polyols and polyoxypropylene polyoxyethylene polyols, have average functionality of from 1.5 to 3.5, preferably from 1.8 to 2.5, and in particular from 2.0 to 2.2, and have number-average molecular weights which are preferably from 1800 to 10 000, particularly preferably from 2400 to 8000, and in particular from 2500 to 6000.

The polyether polyols can be used individually or in the form of mixtures. It can therefore be advantageous to use suitable mixtures composed of polyether polyols whose number-average molecular weights are from 1500 to 4000, preferably from 1500 to 3500, and particularly preferably from 1500 to 3000, and whose functionality is 2.1 or smaller, preferably 2.0 or smaller, and of those whose number-average molecular weights are from 3000 to 6000 and whose functionality is 2.2 or greater, preferably 2.5 or greater. The different functionalities are preferably obtained here via use of different starters.

Other suitable polyols are polymer-modified polyols, preferably polymer-modified polyesterols or polyetherols, particularly preferably graft polyetherols. These are what is known as a polymer polyol, usually has from 5 to 50% by weight, preferably from 10 to 45% by weight, particularly preferably from 15 to 25% by weight and in particular from 18 to 22% by weight, content of polymers which are preferably thermoplastic. These polymer polyesterols are described by way of example in EP-A-250 351 and are usually prepared via free-radical polymerization of suitable olefinic monomers, such as styrene, acrylonitrile, acrylates, and/or acrylamide, in a polyesterol serving as graft base. The side chains are generally produced via transfer of the free radicals of growing polymer chains onto polyesterols or polyetherols. The polymer polyol mainly comprises, alongside the graft copolymer, the homopolymers of the olefins, dispersed in unaltered polyesterol.

One preferred embodiment uses acrylonitrile and styrene as monomers, and in particular uses exclusively styrene. The monomers are polymerized, if appropriate in the presence of further monomers, of a macromer, and of a moderator, and using a free-radical initiator, mostly azo compounds or peroxide compounds, in a polyesterol as continuous phase.

During the free-radical polymerization reaction, the macromers are concomitantly incorporated into the copolymer chain. The result is formation of block copolymers having a polyester block and a polyacrylonitrile-styrene block, these acting as compatibilizer in the boundary between continuous phase and disperse phase and suppressing agglomeration of the polymer polyesterol particles. The proportion of the macromers is usually from 1 to 15% by weight, based on the total weight of the monomers used for preparation of the polymer polyol.

The proportion of polymer polyol is preferably greater than 5% by weight, based on the total weight of component (b). The material can, by way of example, comprise an amount of from 30 to 90% by weight, preferably from 55 to 80% by weight, of the polymer polyols, based on the total weight of component (b). It is particularly preferable that the polymer polyol is polymer polyesterol or is polyetherol.

The reactive chain extenders a2) used comprise substances which have two groups reactive toward isocyanate, these substances having at least one free primary $NH_2$ group and accelerating the polyurethane reaction. The further group reactive toward isocyanate can by way of example have been selected from a primary amino group, an alcohol group, or a thiol group. By way of example, aliphatic or aromatic amines can be used as reactive chain extenders (a2). It is preferable that the reactive chain extender contributes to the thixotropy of the reaction mixture. Particularly preferred reactive chain extenders are therefore low-molecular-weight diamines, in particular aliphatic diamines. For the purposes of this invention, the reactive chain extenders have, between the two groups reactive toward isocyanates, preferably at least two alkylene groups each having one or two carbon atoms, where each of the alkyl groups has separation via a heteroatom. The molar mass of the reactive chain extender (a2) is preferably from 100 to 400 g/mol, particularly preferably from 100 to 200 g/mol, and in particular from 100 to 150 g/mol. Triethylene glycol diamine is particularly preferably used as reactive chain extender. The proportion of the reactive chain extender in the polyol component (A) is preferably from 0.2 to 4.0% by weight, particularly preferably from 0.5 to 2.0% by weight, based on the polyol component (A).

Alongside the reactive chain extenders a2) it is also possible, if appropriate, to use reactive crosslinking agents which have at least one free primary $NH_2$ group, which accelerate the polyurethane reaction, and whose functionality is greater than 2.

Alongside the inventive reactive chain extenders, it is possible to use further conventional chain extenders. Examples of these are diols, particularly preferably monoethylene glycol and butanediol. For the purposes of the invention, it is particularly preferable to use mixtures composed of an inventive reactive chain extender and of a chain extender composed of a diol. The ratio by weight of inventive reactive chain extender to diol here is preferably from 1:5 to 1:50, particularly preferably from 1:10 to 1:15. Mixtures composed of 1,4-butanediol and triethylene glycol diamine are particularly preferably used.

Metal catalysts a3) used can be any of the compounds comprising a metal atom which accelerate the polyurethane reaction. These catalysts are described by way of example in "Kunststoffhandbuch, Band 7, Polyurethane" [Plastics handbook, volume 7, polyurethanes], Carl Hanser Verlag, 3rd edition 1993, chapter 3.4.1. Examples of these suitable metal catalysts are zirconium-, titanium-, tin-, potassium-, bismuth-, zinc-, mercury-, and lead-based catalysts, e.g. tin chloride, dibutyltin, tin oxide, bismuth zinc neodecanoate, dimethyltin carboxylates, stannous salts of organic carboxylic acids, e.g. stannous acetate, stannous octoate, stannous ethylhexoate, and stannous laurate, and the dialkyltin(IV) salts of organic carboxylic acids, e.g. dibutyltin diacetate, dibutyltin dilaurate, dibutyltin maleate, and dioctyltin diacetate, and also bismuth carboxylates, such as bismuth(III) neodecanoate, bismuth 2-ethylhexanoate, and bismuth octanoate, or a mixture thereof. Bismuth zinc neodecanoate and dimethyltin carboxylates are particularly preferred.

Component A of an inventive spray-polyurethane system preferably moreover comprises additives a4). These encompass additives for water adsorption and for thixotropy.

Additives that can be used for thixotropy of the reaction mixture are any of the known additives that contribute to thixotropy. It is preferable to use additives that increase the viscosity of the polyol component. Particular preference is given to those additives which do not sediment even during prolonged storage of the polyol component. In particular, silicon dioxide powder is used. The surface area of this powder is preferably at least 100 m$^2$/g, particularly preferably at least 130 m$^2$/g, and in particular at least 150 m$^2$/g If an additive for thixotropy is used, the amount of additive used for thixotropy is preferably greater than 0.5 percent by weight. The amount of additive for thixotropy is particularly preferably in the range from 0.6 to 2.5 percent by weight, based in each case on the total weight of the spray-polyurethane system.

The additives used for water adsorption preferably comprise aluminosilicates, selected from the group of the sodium aluminosilicates, potassium aluminosilicates, calcium aluminosilicates, cesium aluminosilicates, barium aluminosilicates, magnesium aluminosilicates, strontium aluminosilicates, sodium aluminophosphates, potassium aluminophosphates, calcium aluminophosphates, and mixtures thereof. It is particularly preferable to use mixtures of sodium aluminosilicates, potassium aluminosilicates, and calcium aluminosilicates in castor oil as carrier substance.

The number-average particle size of the additive for water absorption is preferably not greater than 200 µm, particularly preferably not greater than 150 µm, and in particular not greater than 100 µm. The pore width of the inventive additive for water absorption is preferably from 2 to 5 Å.

If an additive for water absorption is added, the amount of this is preferably greater than one part by weight, particularly preferably in the range from 1.2 to 2 parts by weight, based on the total weight of the spray-polyurethane system.

The additive for water adsorption and the additive for thixotropy are preferably used in a ratio by weight of from 1:1 to 9:1, particularly preferably from 1.6:1 to 5:1, the result being inhibition of settling of the additive for water adsorption on prolonged storage in the polyol component (A). This leads to maximization of the effect of the additive for water adsorption.

An inventive spray-polyurethane system can moreover comprise additives such as fillers, antioxidants, dyes, pigments, optical brighteners, and stabilizers with respect to heat, light, or UV radiation, plasticizers, or surfactant substances. Examples of antioxidants and stabilizers with respect to heat, light, or UV radiation are stabilizers from the group of sterically hindered phenols, e.g. Cyanox 1790® from Cytec Industries INC, HALS stabilizers (hindered amine light stabilizer), triazines, and benzophenones, and of the benzotriazoles. Examples of pigments and matting agents are titanium dioxide, magnesium stearate, silicone oil, zinc oxide, and barium sulfate. Examples of dyes are acidic dyes and dispersion dyes. These additives can be added to component (A) or preferably to a component (C). If these additives are added in a component (C), component (C) preferably also comprises a means of solution or dispersion. A preferred means of solution or dispersion used is a compound reactive toward isocyanates, particularly preferably a polyether polyol.

Aromatic isocyanates are preferably used as isocyanate component. Aromatic isocyanates of the general formula R(NCO)$_z$ are preferably used, where R is a polyvalent organic radical which comprises an aromatic system, and z is a whole number which is at least 2. Examples of these are 4,4'-diisocyanatobenzene, 1,3-diiso-cyanato-o-xylene, 1,3-diisocyanato-p-xylene, 1,3-diisocyanato-m-xylene, 2,4-diiso-cyanato-1-chlorobenzene, 2,4-diisocyanato-1-nitrobenzene, 2,5-diisocyanato-1-nitrobenzene, m-phenylene diisocyanate, p-phenylene diisocyanate, toluene 2,4-diiso-cyanate, toluene 2,6-diisocyanate, mixtures composed of toluene 2,4- and 2,6-diiso-cyanate, naphthalene 1,5-diisocyanate, 1-methoxyphenylene 2,4-diisocyanate, diphenylmethane 4,4'-diisocyanate, diphenylmethane 2,4'-diisocyanate, biphenylene 4,4'-diisocyanate, 3,3'-dimethyldiphenylmethane 4,4'-diisocyanate; triisocyanates, such as triphenylmethane 4,4',4''-triisocyanate and toluene 2,4,6-triisocyanate, and tetraisocyanates, such as 4,4'-dimethyldiphenylmethane 2,2',5,5'-tetraisocyanate. Particularly suitable and particularly preferred are toluene diisocyanate, diphenylmethane 2,4'-diisocyanates, diphenylmethane 4,4'-diisocyanate, polymethylene polyphenylene polyisocyanate, and mixtures thereof.

The isocyanate component particularly preferably comprises a modified, polyfunctional isocyanate, for example a product obtained via chemical reaction of the abovementioned polyisocyanates. Examples include polyisocyanates which comprise ester groups, comprise biuret groups, comprise allophanate groups, and preferably comprise carbodiimide groups, comprise uretonimine groups, comprise isocyanurate groups, and/or comprise urethane groups. Specific examples are aromatic polyisocyanates which comprise urethane groups and whose NCO content is from 8 to 33.6 percent by weight, particularly preferably from 18 to 25 percent by weight, for example diphenylmethane 4,4'-diisocyanate or toluene diisocyanate which has been modified via reaction with diols, with triols, with oxyalkylene glycols, with dioxyalkylene glycols, with polyoxyalkylene glycols, with polyester polyols, or with polytetrahydrofuran, and these can be used alone or in the form of mixtures of polyoxyalkylene glycols. Specific examples of the polyoxyalkylene glycols include diethylene glycols, dipropylene glycols, polyoxyethylene glycols, polyoxypropylene glycols, and polyoxypropylene polyoxyethylene glycols. A modified, polyfunctional isocyanate particularly used comprises reaction products of diphenylmethane 4,4'-diisocyanate and of polyether polyols having a functionality of from 1.8 to 3.0, preferably from 1.8 to 2.5.

Another embodiment uses, as polyisocyanate component (B), a mixture composed of diphenylmethane 4,4'-diisocyanate and of a diphenylmethane 4,4'-diisocyanate modified via incorporation of uretdione groups, carbamate groups, isocyanurate groups, carbodiimide groups, or allophanate groups. The isocyanate component here particularly preferably comprises a mixture composed of diphenylmethane 4,4'-diisocyanate and of carbodiimide-modified diphenylmethane 4,4'-diisocyanate.

For the purposes of the invention, the spray-polyurethane system is preferably thixotropic. Thixotropic behavior means here that the viscosity of a specimen sheared at constant shear rate under conditions that are in each case otherwise identical, examples being temperature and time since the components were mixed is lower at higher shear rates (for example shear rates greater than 200 s$^{-1}$) than at low shear rates (for example smaller 1 s$^{-1}$). The viscosity of the spray-polyurethane system is preferably adjusted in such a way that polyol component (A) and isocyanate component (B) can easily be mixed, but do not run when sprayed into a mold, thus permitting uniform distribution of the material sprayed onto a vertical area.

The average functionality per mole of the reactive components used in the spray-polyurethane system is preferably from 1.5 to 3.5, particularly preferably from 1.8 to 2.5, and in particular from 2.0 to 2.2. For the purposes of this invention, reactive components are the isocyanates, polyols, reactive chain extenders, and other chain extenders used.

For the purposes of the invention, the spray-polyurethane system comprises no amine catalysts. For the purposes of the invention, amine catalysts are compounds which catalyze the reaction of isocyanate with a component reactive with isocyanate and comprise a secondary or tertiary nitrogen atom.

The inventive system is suitable for production of backing layers. To this end, the individual components (A), (B), and, if appropriate, (C) are mixed and sprayed into a mold which has, if appropriate, been treated with a mold-release agent, for example one previously described in EP 0303305. Other spray machines suitable for polyurethane systems are also suitable for the process. The mixing of the components here preferably takes place in a mixing head. The isocyanate index of an inventive mixture composed of polyol component (A) and isocyanate component (B) and, if appropriate, of component (C) is preferably from 90 to 110, in particular from 95 to 105. For the purposes of the present invention, the isocyanate index is the stoichiometric ratio of isocyanate groups to groups reactive with isocyanate, multiplied by 100. Groups reactive with isocyanate here are all of the groups present in the reaction mixture and reactive with isocyanate, but not the isocyanate group itself.

In the inventive process, unlike the description in EP 0303305, an additional manufacturing step preferably takes place. This means that after introduction of a suitable mold-release agent, after an adequate drying time, the topcoat layer, also termed "in-mold coating" can be introduced via suitable topcoat tooling. Any of the topcoats known for production of backing layers composed of polyurethane can be used as "in-mold coating" here. The topcoats preferably used comprise polyurethane topcoats using aliphatic isocyanates. Examples of processes that can be used here are the airless spray process or electrostatic application methods. The thickness of this topcoat layer is in the range from 20 to 100 μm. The topcoats are preferably applied using low-emission solvents. Water is often used. In order to inhibit foaming of the polyurethane, a sufficient time for drying of the topcoat has to be provided. The polyurethane is then sprayed uniformly onto the topcoat-coated mold. A polyurethane layer thickness in the range from 0.01 to 10 mm, preferably from 0.1 to 5 mm, and in particular from 0.8 to 1.2 mm, is often desired. After a reaction time which is preferably from 60 to 180 s, the molding is demolded for further processing.

Preferred temperatures of the polyurethane material during spray application are from 30 to 120° C., particularly preferably from 50 to 90° C., and in particular from 60 to 80° C. The mold temperature is preferably from 30 to 120° C., particularly preferably from 55 to 95° C., and in particular from 65 to 85° C. The mold temperature here is preferably higher than that of the polyurethane during spray-application by from 0 to 15° C., particularly preferably by from 5 to 10° C. The average distance of the spray nozzle from the mold surface depends on the geometry of the component and on the way in which the spray cone is formed and is preferably from 0.5 to 30 cm, with preference from 10 to 30 cm. The molds are preferably composed of metal, often steel or aluminum.

Surprisingly, an inventive spray-polyurethane system exhibits excellent processing properties. In comparison with the prior art, an inventive spray-polyurethane system therefore exhibits prolonged pot life after mixing of components (A), (B), and, if appropriate, (C), for the same demolding time. This can therefore give this type of system a longer processing time after mixing. This is particularly important, after mixing in the mixing head, the reaction mixture is passed via a pipeline system to the spray head. Blockage of this pipeline system via prematurely formed polyurethane is thus inhibited or delayed. The "open assembly time" during which the reaction mixture can be processed is, for example, preferably more than 30 seconds, particularly preferably more than 45 seconds, and in particular more than 50 seconds, at 25° C., for a system permitting a demolding time of 60 s. "Demolding time" here means the interval between spray-application of the spray-polyurethane system to the mold and the juncture at which the finished molding can be removed undamaged from the mold. Furthermore, an inventive spray-polyurethane system hardens rapidly after the start of the reaction, which can by way of example be initiated by using a mold temperature higher than that of the polyurethane during spray-application.

The hardening behavior here can be determined via measurement of the storage modulus G'. A plot of the storage modulus G' against time therefore shows a lower plateau which represents the mixture whose reaction is in essence incomplete and which gives the open assembly time for the mixture, and an upper plateau which represents the fully reacted product. When the temperature is constant and open assembly time is greater than 50 seconds, an inventive spray-polyurethane system exhibits a rise in storage modulus G' from the lower plateau to the upper plateau with a hardening rate which is preferably 10 seconds or less, particularly preferably 5 seconds or less, and in particular 3 seconds or less. This ensures that there is less tendency toward flow and thus permits more uniform layer thickness of the finished backing layer, even for complicated shaping.

The inventive backing layer composed of polyurethane features advantageous mechanical properties. This backing layer therefore has excellent properties in relation to tensile strain, tensile strength, and tear propagation resistance. Tensile strain to DIN EN ISO 527 is preferably more than 200%, tensile strength to DIN EN ISO 527 is preferably more than 7.5 N/mm$^2$, and tear propagation resistance to DIN 53515 is preferably more than 17 N/mm.

The backing layer thus obtainable, composed of polyurethane, can be used by way of example in applications where the surface is required to have a leather-like character. Specifically, the inventive backing layer composed of polyurethane can be used by way of example for production of seats, dashboards, consoles, trays, or internal or external automobile trim.

Surprisingly, an inventive backing layer composed of polyurethane has particularly advantageous feel. An advantageous feel is a feel which is pleasant to the touch.

The hardness of the inventive backing layer can be varied widely, for example via the selection of the isocyanate used, the selection of the chain extender mixture, or the selection of the isocyanate index. This is known to the person skilled in the art. An inventive backing layer composed of polyurethane therefore has by way of example a Shore A hardness of from 30 to 80, preferably from 40 to 75, and particularly preferably from 50 to 70.

Another advantage of an inventive backing layer composed of polyurethane is low emission. Emission of volatile constituents (VCO) to VDA 278 is therefore below a value of 100 ppm, preferably below 50 ppm, and particularly preferably below 40 ppm. Emission of condensable constituents (FOG) from an inventive backing layer to VDA 278 is moreover below 20 ppm, preferably below 10 ppm, and particularly preferably below 8 ppm. Emissions to DIN 75201/B (FOGGING) from an inventive backing layer are below 1.5 ppm, preferably below 1 ppm, and in particular below 0.5 ppm. For the purposes of this invention, emission is intended to mean VOC emission to VDA 278. Specifically, the term "emission" encompasses emissions of condensable constituents (FOG) to VDA 278, and also to DIN 75201/B (FOGGING).

Examples are used below to illustrate the present invention.
1.: Formulation:

| Component | Inventive example 1 [% by wt.] | Comparative example 1: [% by wt.] | Comparative example 2: [% by wt.] |
|---|---|---|---|
| Polyol 1 | 70 | 71.75 | 0 |
| Polyol 2 | 15 | 14 | 87.4 |
| Polyol 3 | 0 | 0 | 1.5 |
| Chain extender 1 | 10 | 10 | 7.5 |
| Chain extender 2 | 1.5 | 0 | 2.5 |
| Catalyst 1 | 0 | 1.1 | 0 |
| Catalyst 2 | 0.05 | 0.025 | 0.1 |
| Antifoam | 0.5 | 0.1 | 0 |
| Additive for water adsorption | 1.8 | 2 | 1.0 |
| Additive for thixotropy | 0.65 | 0.65 | 0 |
| Additive for UV stabilization | 0.5 | 0.5 | 0 |
| Isocyanate 1 | 100 | 100 | 60 |
| Isocyanate 2 | 0 | 0 | 40 |
| Index | 100 | 100 | 100 |

The starting materials here are:
polyol 1: a polyether polyol whose number-average molar mass is about 4400 g/mol, prepared starting from glycerol as starter and propylene oxide, and whose terminal ethylene oxide content is about 13% by weight, based on the total weight of the polyol,
polyol 2: a polyether polyol whose number-average molar mass is about 3400 g/mol, prepared starting from propylene glycol as starter and propylene oxide, and whose terminal ethylene oxide content is about 19% by weight, based on the total weight of the polyol,
polyol 3: a polyether polyol whose number-average molar mass is about 270 g/mol, prepared starting from trimethylpropane as starter and trimethylpropane, and whose terminal ethylene oxide content is about 51.3% by weight, based on the total weight of the polyol,
chain extender 1: 1,4-butanediol,
chain extender 2: ethylene glycol diamine whose amine number is 757 mg/g,
catalyst 1: diazabicyclooctane,
catalyst 2: alkyltin mercaptide,
additive for water adsorption: a mixture of sodium aluminosilicates, potassium aluminosilicates, and calcium aluminosilicates,
additive for thixotropy: silicon dioxide powder,
additives for UV stabilization: commercially available UV absorbers,
isocyanate 1: a prepolymer prepared via reaction of diphenylmethane 4,4'-diisocyanate and polyether polyols whose NCO content is 22.9%, and
isocyanate 2: carbodiimide-modified diphenylmethane 4,4'-diisocyanate whose NCO content is 29.5%.

The components stated in table 1 were mixed and sprayed into a mold whose temperature was controlled to 80° C. After solidification, a backing layer whose thickness was 2 mm was demolded. The physical properties of the resultant backing layers are given in table 2 and the emission values of these backing layers are given in table 3. Table 4 gives the open assembly time of the mixtures at 25° C., and also the minimum demolding time of the backing layers obtained.

TABLE 2

| Phys. property | Inventive example 1 | Comparative example 1 | Comparative example 2 |
|---|---|---|---|
| Tensile strain to DIN EN ISO 527 [%] | 330 | 181 | 269 |
| Tensile strength to DIN EN ISO 527 [N/mm²] | 11 | 8 | 6 |
| Tear propagation resistance to DIN 53515 [N/mm] | 18 | 17 | 12 |
| Hardness [Shore A] | 74 | 75 | 75 |

TABLE 3

| Emissions | Inventive example 1 | Comparative example 1 | Comparative example 2 |
|---|---|---|---|
| VOC [ppm] | 23 | 440 | 30 |
| FOG [ppm] | 5 | 8 | 6 |

TABLE 4

| Parameter | Inventive example 1 | Comparative example 1 | Comparative example 2 |
|---|---|---|---|
| Demolding time [s] | 90 | 240 | 90 |
| Open assembly time at 25° C. [s] | 60 | 20 | 30 |

When compared with the comparative examples, a sprayed skin according to inventive example 1 exhibits improved mechanical properties, such as tensile strain, tensile strength, and tear propagation resistance, and also a reduced level of emissions. Furthermore, the open assembly time is markedly longer than in the comparative examples for identical or shorter demolding time.

The invention claimed is:
1. A spray-polyurethane system, comprising polyol component (A) and an isocyanate component (B), where the polyol component (A) comprises
   a1) at least one compound reactive with isocyanate, wherein a1) comprises at least one polyether polyol having a number-average molar mass of from 1,500 to 3,500 g/mol and a functionality of 2.0 or smaller, and at least one polyetherol having a number-average molar mass of from 3,000 to 6,000 g/mol and a functionality of 2.2 or greater,
   a2) from 0.2 to 2.0% by weight based on the weight of the polyol component (A) of at least one reactive chain extender having at least two NH$_2$ groups reactive toward isocyanates, and
   a3) at least one tin catalyst wherein no catalyst containing a secondary or tertiary amine is present in said system.
2. The spray-polyurethane system according to claim 1, wherein the at least one reactive chain extender a2) has, between the two groups reactive toward isocyanates, at least two alkylene groups each having one or two carbon atoms, where each of the alkylene groups has separation via a heteroatom.

3. The spray-polyurethane system according to claim 1, wherein the molar mass of the at least one reactive chain extender a2) is from 100 to 400 g/mol.

4. The spray-polyurethane system according to claim 1, wherein component (A) further comprises additives a4), operable for water adsorption and for thixotropy.

5. The spray-polyurethane system according to claim 4, wherein the additives operable for thixotropy comprise silicon dioxide having a specific surface area of 150 $m^2/g$ or greater.

6. The spray-polyurethane system according to claim 4, wherein the additive for water absorption comprises an aluminosilicate or a mixture of aluminosilicates.

7. The spray-polyurethane system according to claim 6, wherein the average particle size of the additive for water absorption is not greater than 100 μm and comprises pores having a pore width of from 2 to 5 Å.

8. The spray-polyurethane system according to claim 1, wherein the isocyanate component (B) comprises a prepolymer, having at least one component comprising diphenylmethane 4,4'-diisocyanate and of at least one polyether polyol whose average functionality is from 1.8 to 3.

9. The spray-polyurethane system according to claim 1, wherein the isocyanate component (B) comprises at least two components comprising diphenylmethane-4,4'-diisocyanate, of which at least one has been modified via incorporation of uretdione groups, carbamate groups, isocyanurate groups, carbodiimide groups, or allophanate groups.

10. The spray-polyurethane system according to claim 1, wherein the average functionality of reactive components (A) and (B) is from 1.5 to 3.5.

11. The spray-polyurethane system according to claim 1, which further comprises a dye.

12. The spray-polyurethane system according to claim 1, wherein the average functionality of reactive components (A) and (B) is from 1.8 to 2.5.

13. The spray-polyurethane system according to claim 1, wherein the average functionality of reactive components (A) and (B) is from 2.0 to 2.2.

14. The spray-polyurethane system according to claim 1, wherein the tin catalyst is at least one selected from the group consisting of tin chloride, dibutyltin, tin oxide, stannous acetate, stannous octoate, stannous ethylhexoate, stannous laurate, dibutyltin diacetate, dibutyltin dilaurate, dibutyltin maleate and dioctyltin diacetate.

15. The spray-polyurethane system according to claim 1, wherein the tin catalyst is at least one selected from the group consisting of a dimethyltin carboxylate, a stannous salt of an organic carboxylic acid, and a dialkyltin(IV) salt of an organic carboxylic acid.

16. The spray-polyurethane system according to claim 1, wherein the total amount of all of the reactive chain extender having an amine group is no more than 2.0% by weight based on the weight of the polyol component (A).

17. A process for production of a backing layer composed of polyurethane for moldings, comprising mixing the components of the spray-polyurethane system according to claim 1 and spraying them into a mold.

18. A backing layer composed of polyurethane for moldings, obtainable by the process according to claim 17.

19. The backing layer according to claim 18, wherein the tensile strain to DIN EN ISO 527 is greater than 200%, the tensile strength to DIN EN ISO 527 is greater than 7.5 $N/mm^2$, and the tear propagation resistance to DIN 53515 is greater than 17 N/mm.

20. The backing layer according to claim 18, wherein emission of volatile constituents to VDA 278 is smaller than 100 ppm, emission of condensable constituents to VDA 278 is smaller than 20 ppm, and emission to DIN 75201/B is smaller than 1.5 ppm.

21. The backing layer according to claim 18, in the form of a seat, a dashboard, a console, a tray, an internal automotive trim, or an external automobile tram.

* * * * *